United States Patent
Amir (10) Patent No.: US 10,779,099 B2
(45) Date of Patent: Sep. 15, 2020

(54) ANALOG AND DIGITAL MICROPHONE

(71) Applicant: Essence Smartcare Ltd., Herzlia Pituach (IL)

(72) Inventor: Ohad Amir, Herzlia (IL)

(73) Assignee: Essence Smartcare Ltd., Herzlia Pituach (IL)

(*) Notice: Subject to any disclaimer, the term of this patent is extended or adjusted under 35 U.S.C. 154(b) by 0 days.

(21) Appl. No.: 15/777,930

(22) PCT Filed: Nov. 22, 2016

(86) PCT No.: PCT/IL2016/051257
§ 371 (c)(1),
(2) Date: May 22, 2018

(87) PCT Pub. No.: WO2017/090035
PCT Pub. Date: Jun. 1, 2017

(65) Prior Publication Data
US 2018/0352356 A1    Dec. 6, 2018

Related U.S. Application Data (60) Provisional application No. 62/258,559, filed on Nov. 23, 2015.

(51) Int. Cl.
*H04R 29/00* (2006.01)
*H04R 3/00* (2006.01)
(Continued)

(52) U.S. Cl.
CPC ........... *H04R 29/004* (2013.01); *G06F 1/325* (2013.01); *G06F 1/3215* (2013.01);
(Continued)

(58) Field of Classification Search
CPC .... H04R 29/004; H04R 3/00; H04R 2410/00; G06F 1/3215; G06F 1/3231; G06F 1/325; G10L 25/78; Y02D 10/173
(Continued)

(56) References Cited

U.S. PATENT DOCUMENTS 7,010,332 B1 * 3/2006 Irvin .................. H04M 1/05
455/575.2
9,187,060 B1 * 11/2015 Crider ................ B60R 25/10
(Continued)

FOREIGN PATENT DOCUMENTS

| CA | 2869245 | 4/2016 |
| WO | WO 2012/058465 | 5/2012 |
| WO | WO 2017/090035 | 6/2017 |

OTHER PUBLICATIONS

International Preliminary Report on Patentability dated Jun. 7, 2018 From the International Bureau of WIPO Re. Application No. PCT/IL2016/051257. (7 Pages).
(Continued)

*Primary Examiner* — William A Jerez Lora (57) ABSTRACT

A system and method including receiving an activity signal from a detection unit, the activity signal indicative of detected activity, responsive to the received activity signal exceeding a predetermined threshold, switching a digital microphone from a default low-power mode to active mode, and a pre-determined period of time after switching the digital microphone to active mode, switching the digital microphone back to the default low-power mode.

15 Claims, 5 Drawing Sheets

(51) Int. Cl.
G06F 1/3234 (2019.01)
G06F 1/3231 (2019.01)
G06F 1/3215 (2019.01)
G10L 25/78 (2013.01)

(52) U.S. Cl.
CPC ............ G06F 1/3231 (2013.01); G10L 25/78 (2013.01); H04R 3/00 (2013.01); *H04R 2410/00* (2013.01); *Y02D 10/173* (2018.01)

(58) Field of Classification Search
USPC .............. 381/56, 58, 91, 111, 122, 124, 150
See application file for complete search history.

(56) References Cited

U.S. PATENT DOCUMENTS

| | | | |
|---|---|---|---|
| 2007/0001836 A1 | 1/2007 | Singer et al. | |
| 2012/0105193 A1 | 5/2012 | Gritti | |
| 2013/0223635 A1* | 8/2013 | Singer .................. | H04R 1/1041 381/56 |
| 2014/0343949 A1 | 11/2014 | Huang et al. | |
| 2015/0112883 A1* | 4/2015 | Orduna ................ | G06Q 50/265 705/325 |
| 2016/0134966 A1* | 5/2016 | Fitzgerald ................ | H04R 3/00 381/123 |

OTHER PUBLICATIONS

International Search Report and the Written Opinion dated Mar. 5, 2017 From the International Searching Authority Re. Application No. PCT/IL2016/051257. (12 Pages).
Supplementary European Search Report and the European Search Opinion dated Jul. 16, 2019 From the European Patent Office Re. Application No. 16868145.0. (10 Pages).

* cited by examiner

ANALOG AND DIGITAL MICROPHONE

RELATED APPLICATIONS

This application is a National Phase of PCT Patent Application No. PCT/IL2016/051257 having International filing date of Nov. 22, 2016, which claims the benefit of priority under 35 USC § 119(e) of U.S. Provisional Patent Application No. 62/258,559 filed on Nov. 23, 2015. The contents of the above applications are all incorporated by reference as if fully set forth herein in their entirety.

BACKGROUND

Security systems for securing protected premises usually include a detection mechanism such as a movement and/or presence detector, an alarm generator, possibly a panic button and possibly a camera. Microphones are used in security systems at times of suspected activity or danger at the secured location, and for communication between a person at the secured location and the security system operator.

A digital microphone is beneficial over an analog microphone thanks to a better quality of voice reconstruction. On the other hand, analog microphones usually consume significantly less power than digital microphones. In security systems, the larger power consuming microphone may require undesirable and too frequent maintenance operations and battery replacements, or complex installation and connection to the electricity network.

SUMMARY

According to an aspect of some embodiments of the present invention there is provided a system including an activity detection unit, a digital microphone having an active mode and a default low-power mode, and a controller configured to receive from the detection unit an activity signal indicative of detected activity and in response to the received activity signal, switch the digital microphone from the default low-power mode to the active mode.

Optionally, the controller is configured to switch the digital microphone from the default low-power mode to the active mode when the received signal indicates an activity level above a pre-determined threshold.

Optionally, the controller is configured to switch the digital microphone back to the default low power mode after a predetermined period of time.

Optionally, the controller is configured to switch the digital microphone back to the default low power mode when the signal indicates an activity level lower than a second pre-determined threshold.

Optionally, the activity detection unit is an analog sound sensor configured to sense sound and to send a corresponding signal to the controller.

Optionally, the controller is configured to identify voice in the received signal and switch the digital microphone from the default low-power mode to the active mode when voice is identified.

Optionally, the controller is configured to switch the digital microphone from the default low-power mode to the active mode in response to the received signal exceeding a pre-determined threshold level, wherein the threshold level changes according to a period of time during which the sound is sensed.

Optionally, the activity detection unit includes an analog sound sensor and the digital microphone includes a sound digitizer, the sound digitizer configured to receive sound signals from the analog sound sensor and convert the received sound signals to digital signals.

Optionally, the activity detection unit includes a motion sensor outputting activity signal to be received by the controller.

Optionally, the controller is configured to switch the digital microphone from the default low-power mode to the active mode when the activity signal indicates motion with certainty above a predetermined threshold.

Optionally, the activity detection unit is configured to detect presence, motion or sound.

Optionally, the digital unit is powered by batteries.

Optionally, the digital unit is a digital microphone.

Optionally, the active mode enables the digital microphone to detect sound and to output digital signal according to the detected sound, and the low-power mode disables the digital microphone from outputting signals.

According to an aspect of some embodiments of the present invention there is provided a method including receiving an activity signal from a detection unit, the activity signal indicative of detected activity, responsive to the received activity signal exceeding a predetermined threshold, switching a digital microphone from a default low-power mode to active mode, and a pre-determined period of time after switching the digital microphone to active mode, switching the digital microphone back to the default low-power mode.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

Some embodiments of the present invention provide a system including a digital microphone, for example for communication with a security provider. The provided system includes a switch that activates the microphone automatically upon a detection of a triggering action, such as a suspected activity or danger. During times of no triggering activity, the microphone may be set to an off state or to a power saving mode.

A system according to some embodiments of the present invention includes a digital microphone that outputs digital signals when active. In some embodiments, the digital microphone is by default at a low power mode, in which it doesn't output digital signals. The system includes a triggering detection unit such as an analog microphone, a voice activity detector and/or a motion detector. Upon detection of an activity, the triggering unit provides an activation signal to the digital microphone.

It will be appreciated that the triggering detection unit, as well as the digital microphone in low power mode, consumes much less power than the digital microphone when active, for example less than 10 microampere in low power mode instead of about 230 microampere in active mode. Since the digital unit is active only a fraction of the time, the provided security system is overall power efficient and economical. Therefore, the provided system may be suitable to be powered with batteries, without requiring frequent battery replacement. Accordingly, the provided system may comply with standards of battery-operated security systems.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
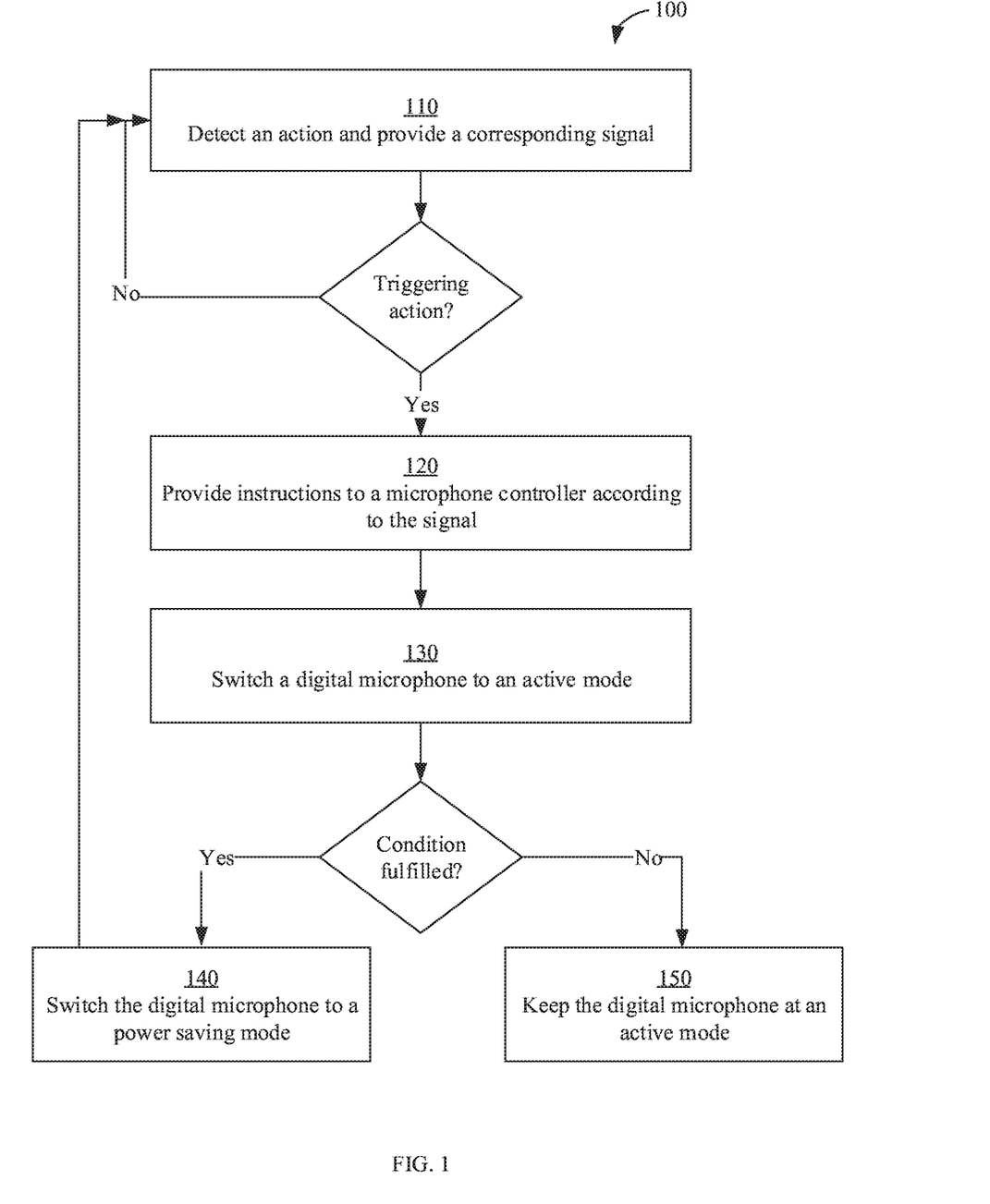
FIG. 1 is a schematic flowchart illustrating a method for activating a microphone of a security system, according to some embodiments of the present invention.

Reference is now made to FIG. 1, which is a schematic flowchart illustrating a method 100 for activating a microphone of a security system, according to some embodiments of the present invention. Further reference is made to FIG. 2, which is a schematic illustration of a security system 200, according to some embodiments of the present invention. Security system 200 may include a detection mechanism 10, for detection of suspected activity, presence and/or movement. Detection mechanism 10 may include, for example, a surveillance camera, a presence detector, a motion sensor, or any other suitable security detection equipment. In some embodiment, detection mechanism 10 includes a low power sound sensor. As indicated herein, analog sound sensors usually consume significantly less power than digital microphones. In some embodiments of the present invention, a low power and/or analog sound sensor may be used, for example, in order to detect noises when protected premises are supposed to be empty or silent, or that a person at protected premises is in distress and/or tries to communicate with the security provider.

Figure 2:
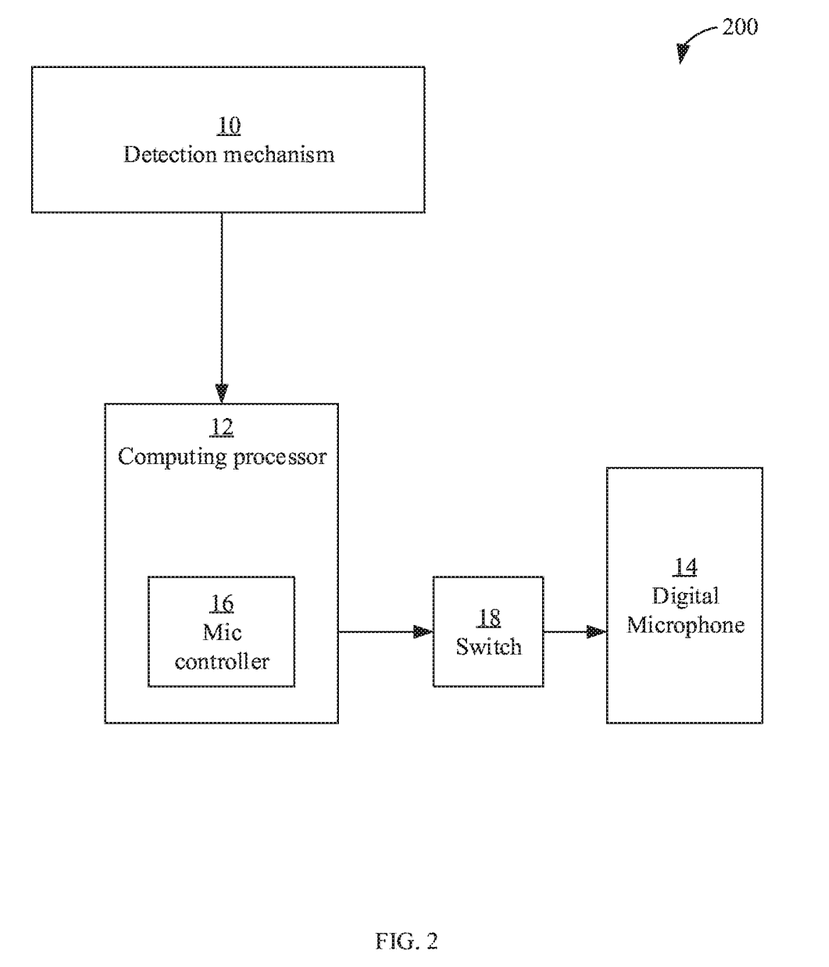
FIG. 2 is a schematic illustration of a security system according to some embodiments of the present invention.

System 200 may include a computing processor 12, a digital microphone 14 and a digital microphone controller 16. Digital microphone controller 16 may include a switch 18, for example for switching digital microphone 14 from a power saving or off mode to active mode and vice versa. It will be appreciated that throughout the present description, a power saving or off mode of microphone 14 means a mode in which microphone 14 does not detect sound and/or does not output signals in response to detected sound. In an active mode, microphone 14 detects sound and outputs signals in response to the detected sound.

Computing processor 12 may be and/or include an electrical circuit, for example a decision circuit, which performs operations on data and/or signals. For example, computing processor 12 may be and/or include an analog circuit, a mechanical device, a filter, and/or any other suitable processing or decision device. It will be appreciated that computing processor 12 should be energetically efficient and/or may include a least power consuming device suitable for some embodiments of the present invention. For example, when a mechanical device or a filter is suitable for use, it may be preferred over an electrical circuit.

As indicated in block 110, detection mechanism 10 may detect an action, such as presence, motion and/or sound, and send a corresponding signal to computing processor 12. Computing processor 12 may decide whether the signal implies a triggering action, for example a suspected activity or danger. For example, computing processor 12 is configured to decide that a signal implies a triggering action in case the signal value exceeds a few millivolts, such as 10 millivolts, depending on the detection mechanism. In case the detected action is determined to be a triggering action, as indicated in block 120, computing processor 12 may provide instructions, for example a triggering signal, to microphone controller 16. As indicated in block 130, based on the instructions, microphone controller 16 may switch digital microphone 14 to an active mode.

Computing processor 12 may keep microphone 14 in an active mode for a predetermined period of time, for example of about several seconds to several tens of seconds, for example a period of time long enough to capture sentences, and/or as long as one or more predetermined conditions are not met, and/or as long as one or more predetermined conditions are met. In the discussion below. For example, a predetermined condition may be that a signal level received from detection mechanism 10 is below a certain value and/or not implying a triggering action. As indicated in block 140, once a predetermined condition is fulfilled, computing processor 12 may provide instructions to microphone controller 16 to switch digital microphone 14 to a power saving or off mode. As indicated in block 150, as long as the predetermined condition is not met, computing processor 12 may keep digital microphone 14 at an active mode. It will be appreciated that checking the predetermined condition may refer to a multiplicity of conditions, wherein each condition should be met or not.

Various exemplary implementations of system 200, according to some embodiments of the present invention, as described herein.

Figure 3:
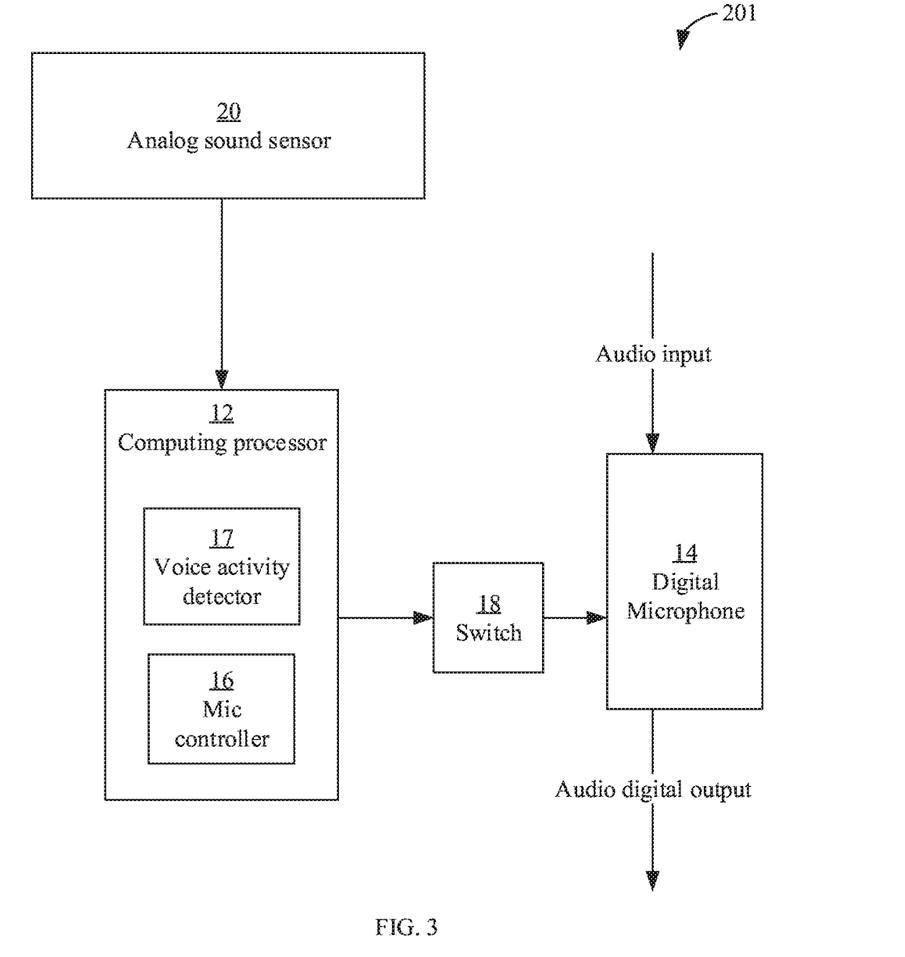
FIG. 3 is a schematic illustration of a variant of the security system, according to some embodiments of the present invention.

Reference is now made to FIG. 3, which is a schematic illustration of a system 201, a variant of system 200 described above, according to some embodiments of the present invention. System 201 may include an analog sound sensor 20. Computing processor 12 may include a voice activity detector 17, i.e. detector of human speech. Voice activity detector 17 may receive sound input from sensor 20 and compare it to a pre-determined threshold of audio level. In some embodiments, voice activity detector 17 may identify a human voice in the received sound input.

Once the sound input level exceeds the threshold and/or a voice is recognized, voice activity detector 17 may produce a triggering signal and send it to microphone controller 16, which may switch microphone 14 to an active mode in response to the triggering signal. Computing processor 12 may keep microphone 14 in an active mode for a predetermined period of time, and/or as long as the sound input exceeds the threshold. Once the sound input runs below a predetermined audio level, and/or a predetermined time has lapsed, computing processor 12 may instruct controller 16 to switch microphone 14 to a power saving or off mode.

In some embodiments of the present invention, the threshold of audio level that triggers a signal may be dynamic. For example, the threshold may be higher for sounds extending over a shorter period of time and lower for sounds that extend over a longer period of time. In some embodiments, the threshold varies according to typical sound level in the relevant environment, for example at least 105 decibels or any other suitable value more or less than a normal sound level in the relevant environment.

Figure 4:
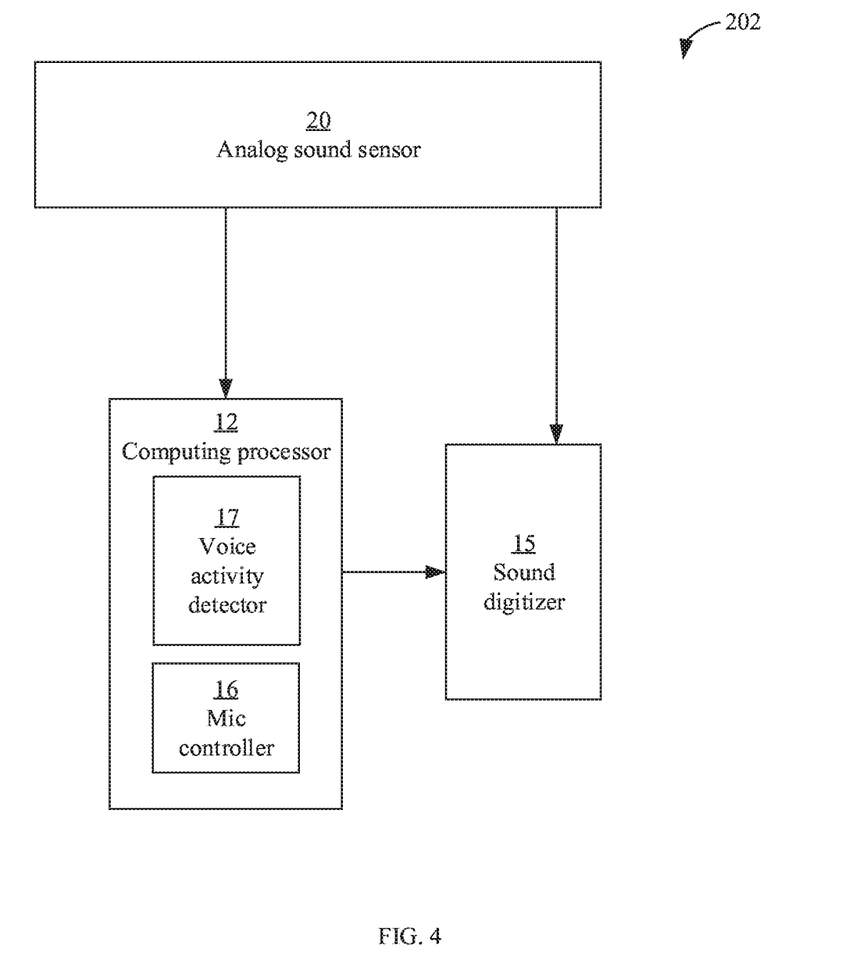
FIG. 4 is a schematic illustration of another variant of the security system, according to some embodiments of the present invention.

Another variant of system 201 is shown in FIG. 4, which is a schematic illustration of a system 202, according to some embodiments of the present invention. System 202 may include a sound digitizer 15, configured to receive an analog sound input from analog sensor 20 and convert it to a digital signal.

Voice activity detector 17 may receive sound input from sensor 20 and compare it to a pre-determined threshold of audio level, as described herein. Once the sound input exceeds the threshold, voice activity detector 17 may produce a triggering signal and send it to digitizer 15. In response to the triggering signal, digitizer 15 may be activated to produce digital audio output by converting the input from sensor 20 to a digital signal. Computing processor 12 may keep digitizer 15 active for a predetermined period of time, and/or as long as the sound input exceeds the threshold. Once the sound input runs below a predetermined audio level, and/or a predetermined time has lapsed, computing processor 12 may deactivate digitizer 15, which in response may cease to produce digital audio output.

Figure 5:
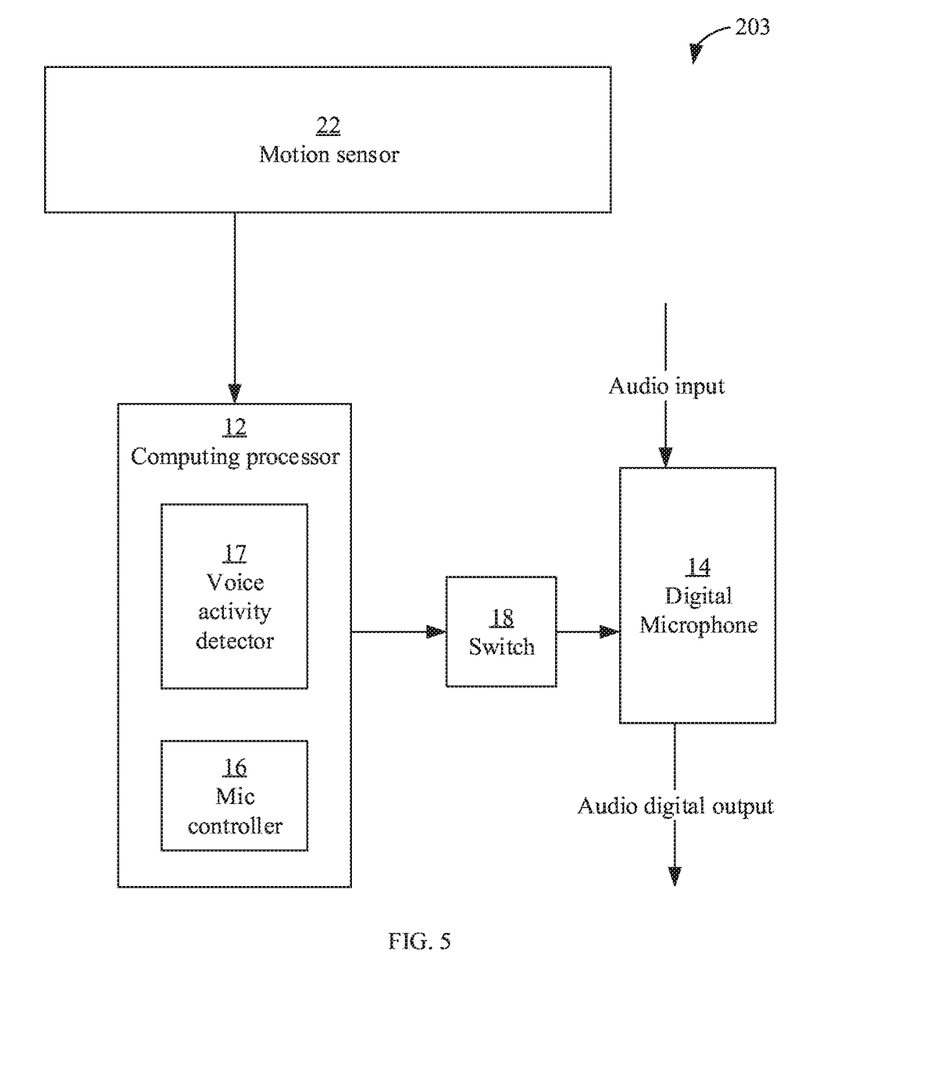
FIG. 5 is a schematic illustration of another variant of the security system, according to some embodiments of the present invention.

Reference is now made to FIG. 5, which is a schematic illustration of a system 203, a variant of system 200 described above, according to some embodiments of the present invention.

System 203 may include a motion sensor 22. Motion sensor 22 may detect motion by infrared/temperature detection, image analysis, audio analysis, and/or any other suitable motion detection method. For example, motion sensor 22 may include a camera, a passive infrared sensor, a microwave sensor, an ultrasonic sensor, a radio-based sensor, and/or any other suitable motion detection tool. Computing processor 12 may receive input from sensor 22 and detect motion based on the received sensor input. Computing processor 12 may assign a certainty value to a detected motion, according to a measure of certainty in which the existence of motion can be determined.

In case a motion is detected and/or the certainty value of a detected motion exceeds a predetermined certainty threshold, computing processor 12 may provide instructions, for example a triggering signal, to microphone controller 16. Based on the instructions, microphone controller 16 may switch digital microphone 14 to an active mode. As described above, computing processor 12 may keep microphone 14 in an active mode for a predetermined period of time, and/or as long as a motion is detected and/or the certainty value of a detected motion exceeds a predetermined certainty threshold. Otherwise, and/or in case a predetermined period of time lapsed, computing processor 12 may provide instructions to microphone controller 16 to switch digital microphone 14 to a power saving or off mode.

It will be appreciated that other variants and combinations of the described systems are possible according to some embodiments of the present invention. For example, detection mechanism 10 and/or computing processor 12 may include a timer, a motion detector, a magnetic detector, a temperature sensor, an intrusion detector or any other suitable security detector.

Detector mechanism 10 may be co-located with microphone 14 and/or with computing processor 12, or may be located remotely from microphone 14 and/or from computing processor 12. Detector mechanism 10 may communicate with computing processor 12 and/or microphone 14 through any direct or indirect, wired or wireless communication channel.

The methods as described above are used in the fabrication of integrated circuit chips.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A system comprising:
   a digital microphone having an active mode and a default power saving mode or off mode;
   an analog microphone that consumes less power than the digital microphone in the active mode;
   an activity detection unit that detects activity based on an analog sound signal associated with the analog microphone; and
   a controller configured to:
   receive from the activity detection unit an activity signal indicative of the detected activity; and
   in response to the received activity signal, switch the digital microphone from the default power saving mode or off mode to the active mode.

2. The system of claim 1, wherein the controller is configured to switch the digital microphone from the default power saving mode or off mode to the active mode when the received signal indicates an activity level above a pre-determined threshold.

3. The system of claim 1, wherein the controller is configured to switch the digital microphone back to the default power saving mode or off mode after a predetermined period of time.

4. The system of claim 1, wherein the controller is configured to switch the digital microphone back to the default power saving mode or off mode when the activity signal indicates an activity level lower than a second predetermined threshold.

5. The system of claim 1, wherein the controller is configured to identify voice in the received signal and switch the digital microphone from the default power saving mode or off mode to the active mode when voice is identified.

6. The system of claim 1, wherein the controller is configured to switch the digital microphone from the default power saving mode or off mode to the active mode in response to the received signal exceeding a pre-determined threshold level.

7. The system of claim 1, wherein the controller is configured to switch the digital microphone from the default power saving mode or off mode to the active mode when the activity signal indicates motion with certainty above a predetermined threshold.

8. The system of claim 1, wherein the system is powered by batteries.

9. The system of claim 1, wherein the active mode enables the digital microphone to detect sound and to output digital signal according to the detected sound, and the power saving mode or off mode disables the digital microphone from outputting signals.

10. The system of claim 1, wherein the analog sound signal is received from the analog microphone.

11. The system of claim 1, wherein the analog sound signal is received from an analog sound sensor in the analog microphone.

12. A method for operating a system comprising: a digital microphone having an active mode and a default power saving mode or off mode, an analog microphone that consumes less power than the digital microphone in the active mode, the method comprising:
   detecting activity based on an analog sound signal associated with the analog microphone; and
   responsive to the receiving an activity signal indicative of the detected activity, switching the digital microphone from the default power saving mode or off mode to the active mode.

13. The method of claim 12, further comprising: a predetermined period of time after switching the digital microphone to active mode, switching the digital microphone back to the default power saving or off mode.

14. The method of claim 12, further comprising: switching the digital microphone back to the default power saving mode or off mode when the activity signal indicates an activity level lower than a second pre-determined threshold.

15. The method of claim 12, wherein the active mode enables the digital microphone to detect sound and to output digital signal according to the detected sound, and the power saving mode or off mode disables the digital microphone from outputting signals.

* * * * *